Feb. 7, 1950     H. C. WOLFE     2,496,972
SCOURING ATTACHMENT FOR ELECTRIC MIXERS
Filed July 8, 1946
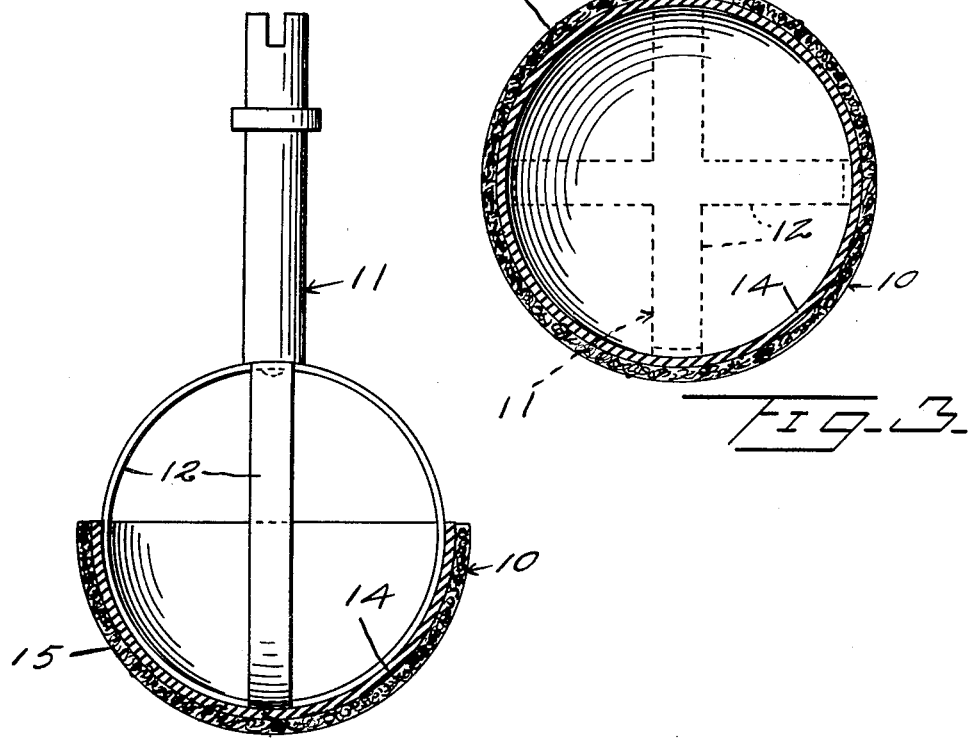
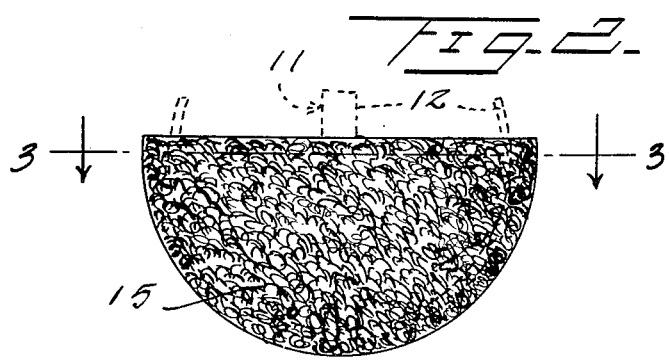
Inventor
Helen C. Wolfe
By Kimmel & Crowell
Attorneys Patented Feb. 7, 1950

2,496,972

UNITED STATES PATENT OFFICE 2,496,972

SCOURING ATTACHMENT FOR ELECTRIC MIXERS

Helen C. Wolfe, Cincinnati, Ohio

Application July 8, 1946, Serial No. 681,862

2 Claims. (Cl. 15—230)

This invention relates to a device for attachment to an electric mixer for scouring and polishing utensils.

An object of this invention is to provide an attachment for a household electric mixer which may be attached to a beater for scouring and polishing kitchen utensils.

Another object of this invention is to provide an attachment for an electric mixer having a resilient body for frictionally engaging about a standard beater attachment as an electric mixer, of the type known as Mixmaster, and having an outer surface of steel wool or other suitable non-rusting and non-corrosive abrasive.

Still another object of this invention is to provide an attachment of the kind to be hereinafter described, which may be attached to an electric mixer beater attachment for scouring and polishing utensils with the power of the mixer, thereby eliminating the laborious manual labor heretofore necessary for such work.

Yet another object of this invention is to provide an electric powered abrasive device for cleaning and scouring utensils such as are used in bakeries, restaurants and similar establishments as well as for scouring household utensils.

A still further object of this invention is to provide an attachment which may readily be installed on an electric beater or any other suitable device for scouring utensils which attachment may be readily manufactured and sold at an economical price.

With the above and other objects in view, my invention consists in the arrangement, combination and details of construction disclosed in the drawings and specification, and then more particularly pointed out in the appended claims.

In the drawings,

Figure 1 is a vertical section of my attachment as applied to a beater for an electric mixer, Figure 2 is a side elevation, and Figure 3 is a top plan view.

Referring to the drawings, the numeral 10 designates generally a scouring attachment for a beater 11 of an electric mixer, constructed according to an embodiment of my invention.

A very large number of homes and most bakeries, restaurants and similar institutions are provided with portable electric mixers for general kitchen work as beating batters, whipping cream, and mixing many types of foods. These mixers are generally equipped with various shaped attachments for use with different types of foods and nearly all such mixers are provided with a beater having a lower end of flat strips of metal, as 12, and generally shaped or formed into spherical configuration or at least hemispherical on the lowermost end. Also used in homes and establishments of the kind described above, are pots and pans which are very difficult to clean and must be scoured. A very satisfactory scouring material for cleaning such utensils is a product known as steel wool which is formed into a pad and may be manually rubbed on the utensils.

For large pans and in commercial establishments, this job of manually scouring the utensils is very laborious and requires considerable time. In order to eliminate this laborious task and to minimize the time required therefor, I have provided a resilient cup having an abrasive covering on the outside which may be readily attached to and/or removed from the lower end of a beater attachment for portable electric beaters.

This attachment is formed of a substantially hollow hemispherical thin wall body 14 which may be made of rubber or any other suitable resilient material. Fixed on the outer side of the body 14 by gluing or by being partially impregnated or imbedded in the resilient material there is provided an abrasive material 15 which, in the preferred form, would be composed of shredded metal as steel wool or other non-rusting and non-corrosive material, although other forms of abrasive materials may be used.

In use the scouring attachment 10 is fitted on to the lower end of a substantially spherical, or at least hemispherical beater attachment by pressing the resilient body 14 thereon, the body 14 yielding sufficiently to enclose the lower end of the beater and being relieved thereon by the frictional engagement of the body 10 with the flat metal strips 12.

Since steel wool pads, after a little use, partially disintegrate leaving short threads protruding, manual operation is uncomfortable on the hands, and by the use of a device of this kind such discomfort is eliminated.

The device may be used by persons not having an electric mixer by using this attachment 10 on a suitable wooden form, as a potato masher, or other suitable object.

I do not mean to confine myself to the exact details of construction herein disclosed but claim all variations falling within the purview of the appended claims.

What I claim is:

1. A scouring attachment for an electric mixer comprising a rotatable shaft, a pair of right angularly related intersecting circular resilient strips fixed to the lower end of said shaft, a resilient body substantially greater in configuration than a hemisphere engageable about the lower ends of said circular strips, and an abrasive outer surface on said body.

2. A scouring attachment for an electric mixer comprising a rotatable shaft, a pair of right angularly related intersecting circular resilient strips fixed to the lower end of said shaft, a resilient hollow rubber body substantially greater in configuration than a hemisphere and resiliently engaging about the lower ends of said circular strips, and abrasive material impregnated into the outer surface of said body.

HELEN C. WOLFE.

REFERENCES CITED

The following references are of record in the file of this patent:

UNITED STATES PATENTS

| Number | Name | Date |
|---|---|---|
| 180,080 | Van Drezer | July 18, 1876 |
| 587,198 | Gilroy | July 27, 1897 |
| 701,285 | Brewington | June 3, 1902 |
| 1,591,143 | Robbins | July 6, 1926 |
| 1,870,349 | Taylor | Aug. 9, 1932 |
| 1,926,223 | Albera | Sept. 12, 1933 |
| 2,058,213 | Cannonito | Oct. 20, 1936 |
| 2,275,339 | Allison | Mar. 3, 1942 |
| 2,311,879 | Schultz | Feb. 23, 1943 |

FOREIGN PATENTS

| Number | Country | Date |
|---|---|---|
| 540,530 | France | Apr. 19, 1922 |